Jan. 11, 1949.　　　A. J. GINSBERG　　　2,458,699
FILM RACK
Filed Nov. 16, 1945　　　2 Sheets-Sheet 1
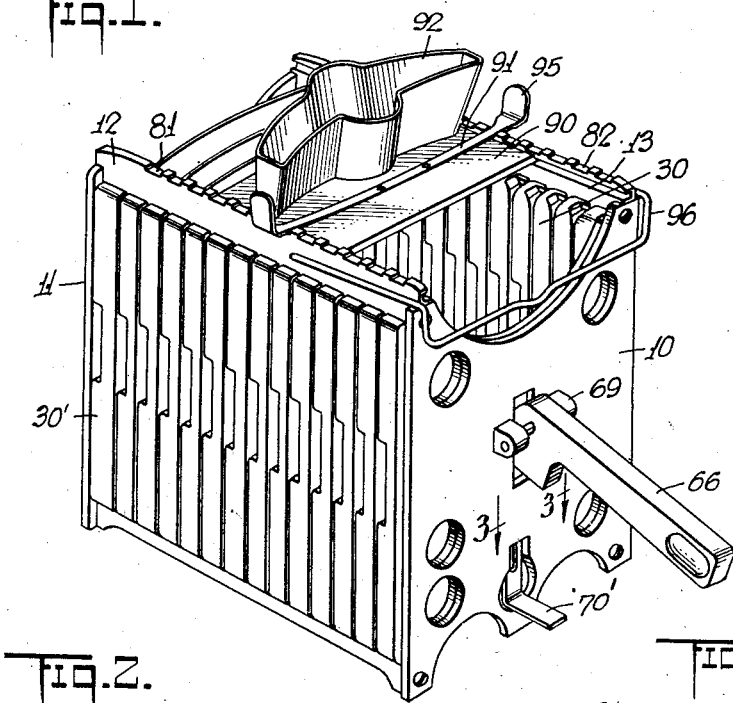
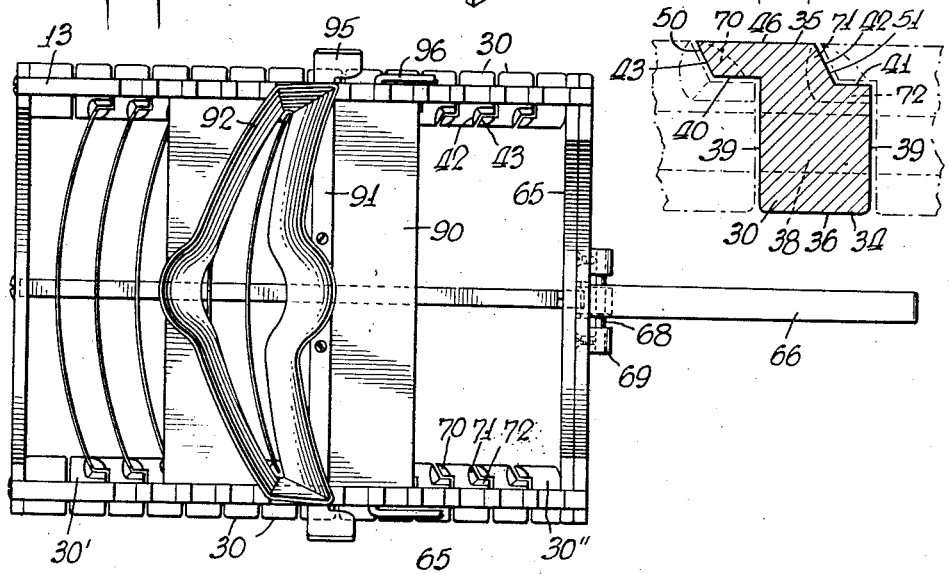
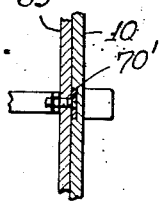
INVENTOR
*Abraham J. Ginsberg*
BY
ATTORNEYS

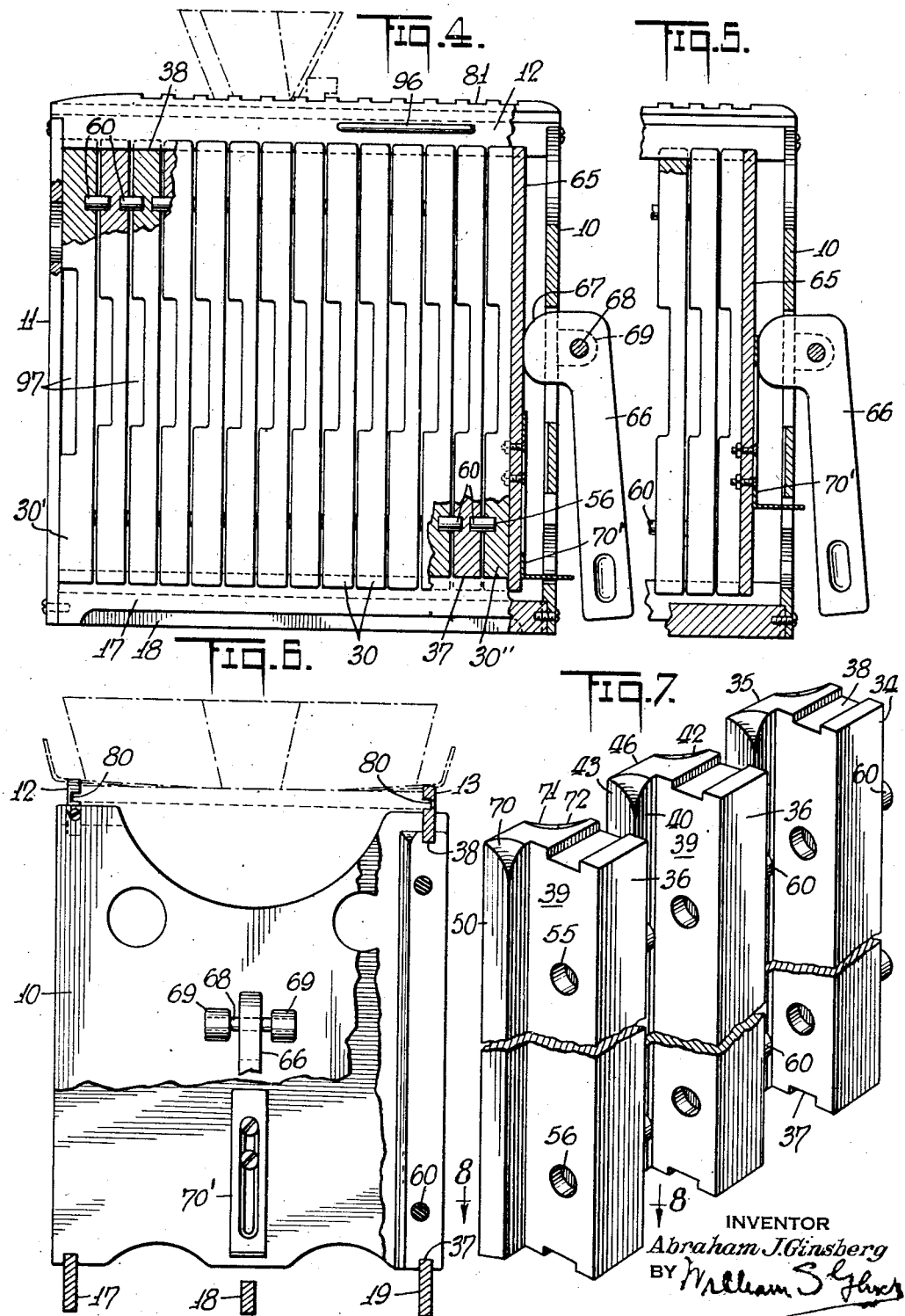

Patented Jan. 11, 1949

2,458,699

UNITED STATES PATENT OFFICE 2,458,699

FILM RACK

Abraham J. Ginsberg, New York, N. Y.

Application November 16, 1945, Serial No. 629,145

4 Claims. (Cl. 95—100)

This invention relates to a new and useful apparatus for holding photographic films for treatment in a group in the conventional operations commonly carried on in the art of photography, such as developing, fixing, washing, and the like.

It is among the general objects of my invention to provide apparatus for effecting uniform distribution of chemical reagents and other fluids used during the treatment of photographic film; to provide apparatus whereby operations requiring darkness may be carried out; and further to provide apparatus particularly adapted for the reception of flexible films and permitting such films to be conveniently positioned in such apparatus in complete darkness preparatory to development thereof, and permitting the convenient handling of such films during subsequent operations.

For the attainment of these objects and such other objects as may hereinafter appear or be pointed out, I have illustrated one embodiment of my invention in the drawings, wherein:

Figure 1 is a perspective view of my film rack;

Figure 2 is a plan view as seen from above looking down on Figure 1;

Figure 3 is a section of the detail taken on line 3—3 of Figure 1;

Figure 4 is a side view partly in section;

Figure 5 is a view on a slightly enlarged scale of the front portion of Figure 4, showing a slightly different position of the box;

Figure 6 is a front elevational view, partly broken away;

Figure 7 is an enlarged view of the detail; and

Figure 8 is a cross-section taken on line 8—8 of Figure 7.

Before describing the details of the illustrated embodiment, I will premise that it is essentially a device for receiving and holding films for development, fixing and the like in a conventional manner. The embodiment disclosed has been designed so that it can be received in a tank into which the developing or fixing fluid is entered to permeate freely through the film holding device and act upon the surfaces of the films held therein; and upon viewing the various figures of the drawings it will be observed that the illustrated device is comprised generally of these three features: (a) a relatively rigid frame with open sides and open top; (b) a series of elements held in the open sides of this rigid frame to define channels in which the edges of the films are received and clamped; and (c) an arrangement whereby the films can be caused to enter these channels so as to assume the desired predetermined relation to each other.

The fixed frame comprises a front plate 10 and a rear plate 11 connected at the top by the side rails or bars 12 and 13 and at the bottom by the side rails or bars 17 and 19. The rails 12, 13, 17 and 19 can be secured to the front and rear plates 10 and 11 in any preferred or desired manner. Headed screws have been shown in the drawing for this purpose. The rigid frame is entirely open at each side except that the rail 12 is at the top at one side and the rail 17 at the bottom at that side, and the rail 13 is at the top of the other side and the rail 19 is at the bottom of the other side. An additional member 18 interconnects the front and rear plates at the bottom and serves as a stop means for films entered into the rack.

Upon viewing Figures 1, 2 and 4 of the drawings, it will be observed that a group of vertically extending elements or bars 30 are engaged with and aligned by the upper and lower rails 12 and 17 to form what is in effect one side of the holder and that a second group of vertically extending elements 30 are similarly engaged with and aligned by the upper and lower rails 13 and 19.

One of these elements is shown in horizontal cross section on an enlarged scale in Figure 8 of the drawing, and three of these elements are shown in perspective (also on an enlarged scale) in Figure 7, aligned about as they are when assembled with the frame but however in spaced apart or exploded relation and with their middle portions broken away so that Figure 7 shows only the top and bottom portions of these three elements. These elements are all identical with the exception of the end elements 30 in each group which are different in the respects and for reasons shortly to be pointed out.

The detailed construction of one of the intermediate elements will now be explained by reference to Figures 7 and 8 and its description will suffice also for all the other intermediate elements 30. The intermediate elements 30 are each comprised from top to bottom of a front portion 34 and a rear portion 35. The front portion shown as generally defined by front face or wall 36 and side faces 39 shown parallel and at right angles to the front face, is provided on its top wall or face with a groove 38 which extends for the full width of that half and on its bottom face with a groove 37 which may be of a similar character. The rear portion 35 of each element is defined by wall portions 40 and 41, the angularly directed side wall portions 42 and 43 and the end wall or face 46 which may be generally parallel to the front face 36 of the front portion 34 of the element and also to the wall portions 40 and 41.

As a result, the rear portion of each of the aforementioned intermediate elements 30 presents a flange portion 50 which projects laterally from one of the inner corners of the element and extends for the full length thereof. This flange 50 is defined by the aforementioned wall faces 40 and 46 which are shown parallel and the connecting wall 43. The other inner corner of the element is cut away to leave the corner channel 51 which extends also for the full length of the element and it in turn is defined by the wall 41 which as stated may be parallel to the wall 40 and the angularly directed wall 42. It will be observed that the walls 42 and 43 are shown as parallel and the wall 41 which defines the depression 51 is shown as located somewhat outwardly of the wall 40 for reasons that will now be pointed out.

The flanges 50 and the depressions 51 of the intermediate elements are so dimensioned and related that when a number of intermediate elements 30 whose cross section is as shown in Figure 8, are assembled in lateral relation close to each other with their front faces 36 in alignment, the flange 50 of each element will be received in the depression 51 of the next adjacent element. One of the reasons for positioning the wall 41 which defines the channel 51, somewhat outwardly of the wall 40 of the flange or abutment is to allow for a limited adjustment of adjacent elements.

In the illustrated embodiment, I show each side wall 39 of each of the intermediate elements 30 as provided with a recess 55 adjacent its top and with a second recess 56 adjacent its bottom and which may be of the same character. The recesses 55 on the opposite side faces of each element 30 are located in alignment and the same is true of the two recesses 56 at the bottom of each element. The recesses 55 are located alike in all of the elements so that when the group of fourteen elements 30 are assembled with the frame as shown in Figure 4, for example, all of the recesses 55 at the top of the group of elements will be in longitudinal alignment and the same will be true of the recesses 56 adjacent the bottom of these elements. As a result of this arrangement all the intermediate elements are freely interchangeable so that matching is rendered unnecessary.

The thickness of the front portion of each of the elements which is uniform for all the elements is such that when a group is assembled with the holder as shown in Figure 4 and the elements compacted, the total of the linear distances of the elements will be less than the length of the frame as measured between the inner faces of the front and rear plates 10 and 11.

It will be observed on viewing the broken away sections in the upper left and lower right end corners of Figure 4 that members 60 of a length greater than the depth of recesses 55 each has its opposite ends received in the recesses 55 in the adjacent side face 39 of each pair of intermediate elements 30. Members 60 preferably take the conformation of the recesses 55 and are therefore shown as cylindrical. They are comprised of a compressible, distortable, resilient material such as rubber and the length of the members is so related to the depth of the recesses that when the members are permitted to assume their normal expanded condition they will force the adjacent elements 30 into spaced apart relation.

The end members 30' and 30'' of the group of fourteen to each side (see Fig. 4) correspond as to details of construction to the intermediate members 30 except that the outer side faces present no abutment and are completely in contact with the rear plate 11 and the backing plate 65.

The top edges of the rear portion 35 of the elements 30 are chamfered or bevelled off as shown at 70, 71 and 72.

The following observations will now be made of the construction thus far described by reference to Figure 2 where it will be observed that the projecting abutment 50 of one element and the cooperating depression 51 of the adjacent element in effect form two jaws which are adjustable toward and from each other as the elements are correspondingly adjusted by operating the lever 66 and that these jaws present engaging surfaces which are parallel to each other but are at an angle to both the length and width of the frame. It will be here stated that the function of these jaws which extend from the top to the bottom of the frame is to engage the edges of the film to be developed or washed. The films are entered into the channel between these jaws from the top and this entry of the lower opposite corners of the film is facilitated by the aforementioned bevelling 70, 71 and 72 just described which will be shortly explained and the reasons for the angling of the cooperating walls 42 and 43 to present similar portions at an angle to each other.

Reference will be again made to Figures 4 and 5 of the drawing wherein an end plate 65 is shown as secured against the outer face of the end members 30''. The upper and lower ends of this plate 65 are provided with channels adjacent each end in which the lower end of the upper frame members 12 and 13 and the upper end of the lower frame members 17 and 19 may be received. The backing plate 65 will therefore secure to and move with the two opposed elements at one end of the groups on the opposite sides. A lever 66 for a cam face 67 is pivoted at 68 to a bracket 69 extending forwardly from the front plate 10 and the dimensions and location of the plates are such that the cam surface 67 when the lever 66 is moved from its position of Figure 1 to its position of Figure 4 it will force the backing plate 65 inwardly to bring the elements more closely adjacent to each other and in so doing will place the spacing members 60 under compression. A counter-clockwise movement of the lever 66 will release the pressure of the cam and permit the members 60 to assume their normal position and in so doing will increase the spacing between the members 30 to their limit which is arrived at when the plate 65 contacts with the front plate 10.

A slotted member 70' is adjustably secured to the backing plate 65 for engagement with the cam surface 67 when greater compression of the spacing members 60 to define smaller channels between the intermediate elements 30 is required for holding films of diminishing thickness.

The top rails 12 and 13 extend upwardly for a substantial distance above the elements 30 and are provided on the level above these elements and on their inner surfaces with longitudinally extending channels 80 both opening inwardly. The top edges of 12 and 13 are provided with the depressions 81 and 82 to give the top edge of the rails 12 and 13 a tooth-like conformation.

A carriage 90 has its side edges engaged in the channels 80 so that it can be entered into the channel at one end and moved back and forth therein. A member 91 secured intermediate its ends to the upward face of the carriage 90 has spring arms 91 pivoted in the direction oppositely of the direction of the rails, the spring arms being of a width at the point adjacent the rails so they can be received within the depressions 81 and 82 between adjacent teeth of the rails 12 and 13. These spring arms are widened at their ends and bent upwardly as shown at 95 so that by manipulating the portions 95 upwardly the engagement of the spring arms with the teeth can be released and the carriage adjusted to any predetermined position. A feeding mouth 92 is carried by the carriage 90 and is shown as projecting to the left in Figure 2. The major dimension of this mouth extends across the width of the frame. Its walls taper downwardly to the exit end of the mouth which is at the bottom and it will be here stated that the exit end of the mouth is of a width that corresponds to the distance between the jaws on opposite sides of the frame.

I will explain the manner in which and the purpose for which my invention is employed by reference to Fig. 2. It will be observed that the films have their edges engaged between the jaws on opposite sides of the frame and that the distance between these jaws is less than the width of the film, so that the film is constrained to take a curved conformation as seen when looking down upon either its top or bottom edge. The loader shown in this figure has been moved step by step to the position shown therein where it now contains a film ready to be positioned into opposed channels intermediate the length of the frame.

The film inserted into the mouth of the loader is pushed down into the channels formed by the inter-engaging elements 30. The member 18 which extends across the bottom of the frame between the front plate 10 and the rear plate 11 serves as a stop means for the inserted film. The spring arms 91 of the loader are next manipulated upwardly by means of the portions 95 to release the engagement of the spring arms in the depressions 81 and 82 of the rails 12 and 13. The depressions 81 and 82 are so positioned in relation to the vertically extending elements 30 that when the spring arms 91 are engaged in a pair of depressions 81 and 82 the exit end of the feeding mouth 92 will be positioned directly over and in alignment with a pair of channels defined by a pair of adjacent inter-engaging elements 30.

The operation described above is successively repeated moving the loader stepwise along the rack to progressively engage with the depressions 81 and 82 until the desired number of films has been inserted into the rack. When this has been accomplished the cam lever 66 is moved downwardly, forcing the backing plate 65 inwardly to closely compact the interengaging elements 30 and clamp the films firmly in the channels defined by adjacent elements.

The films which have assumed a curved conformation in the rack are held rigidly between the jaws of the closely compacted elements 30 and are stiffened by the clamping action, thereby preventing contact of adjacent films. After the rack has been loaded it may be conveniently manipulated by the handle 96 and placed in the proper treating bath.

Referring to Fig. 4, it will be seen that the middle portions of the interengaging elements 30 are constructed to define aligned slots 97. These slots allow free access of chemical reagents, developing fluids and the like in the treating bath to the film surfaces. To achieve the same purpose, openings may be provided in the front and rear plates 10 and 11 and the backing plate 65.

Since certain modifications may be made in the apparatus of my invention without departing from its scope, it is intended that all the matter disclosed herein or shown in the accompanying drawings shall be interpreted as illustrative and not in a limiting sense.

What I claim as new and desire to secure by Letters Patent is:

1. A rack for holding photographic films for group developing, fixing and the like, comprising a relatively rigid frame having front and rear walls secured in relatively rigidly spaced apart relationship to define a carrier having open sides and an open top and a group of members held aligned in each of the open sides of said carrier and parallel to the front and rear walls to form side walls therefor, the totality of the widths of each aligned group being less than the distance between front and rear walls of the frame, the members of each group being free to spread apart to leave a space between adjacent members of the group, means normally operative to space apart the members of each group whereby films can be entered into said carrier through its open top with their edges received in said spaces between adjacent spread apart members and means for compacting said members so that the edges of films will be clamped therebetween.

2. A rack for holding photographic films for group developing, fixing and the like, comprising a relatively rigid frame having front and rear walls secured in relatively rigidly spaced apart relationship to define a carrier having open sides and an open top and a group of members held aligned in each of the open sides of said carrier and parallel to the front and rear walls to form side walls therefor, the totality of the widths of each aligned group being less than the distance between front and rear walls of the frame, the members of each group being free to spread apart to leave a space between adjacent members of the group, means normally operative to space apart the members of each group whereby films can be entered into said carrier through its open top with their edges received in said spaces between adjacent spread apart members, said means comprising distortable elements engaged with and between adjacent members of each group and means for compacting said members so that the edges of the film will be clamped therebetween.

3. A rack for holding photographic films for group developing, fixing and the like, whose opposed walls are each composed of an assembly of separable elongated members, each member being comprised of an inner half and an outer half, the inner half having parallel side walls which are inclined so that one end of said inner half projects laterally beyond one end of the outer half and the other end of said inner half terminates short of the other end of the outer half, the side walls of the inner halves of said members all being inclined to the same degree whereby a group of said members may be held assembled with one end of the front half of each member in overlapping relationship to an end of the front half of an adjacent member so that when the adjacent members are spread apart, an inclined space will be provided between their inner halves within which an edge of the film can be received.

4. A rack for holding photographic films for group developing, fixing and the like, comprised of front and rear walls and side bars connecting the two and of opposed side walls each composed of an assembly of separable elongated members, each member being comprised of an inner half and an outer half, the inner half having parallel side walls which are inclined so that one end of said inner half projects laterally beyond one end of the outer half and the other end of said inner half terminates short of the other end of the outer half, the side walls of the inner halves of said members all being inclined to the same degree whereby a group of said members may be held assembled with one end of the front half of each member in overlapping relationship to an end of the front half of an adjacent member so that when the adjacent members are spread apart, an inclined space will be provided between their inner halves within which an edge of the film can be received, and means on the member cooperating with the side bars for holding the members in alignment for limited separation.

ABRAHAM J. GINSBERG.

REFERENCES CITED

The following references are of record in the file of this patent:

UNITED STATES PATENTS

| Number | Name | Date |
| --- | --- | --- |
| 1,194,321 | Randall | Aug. 8, 1916 |
| 1,234,641 | Dickson | July 24, 1917 |
| 1,782,068 | Hazell | Nov. 18, 1930 |
| 1,969,893 | Leahy | Aug. 14, 1934 |
| 2,112,028 | Kirby | Mar. 22, 1938 |
| 2,190,754 | Carleton | Feb. 20, 1940 |

FOREIGN PATENTS

| Number | Country | Date |
| --- | --- | --- |
| 593,594 | Germany | Mar. 3, 1934 |